Figure 2:
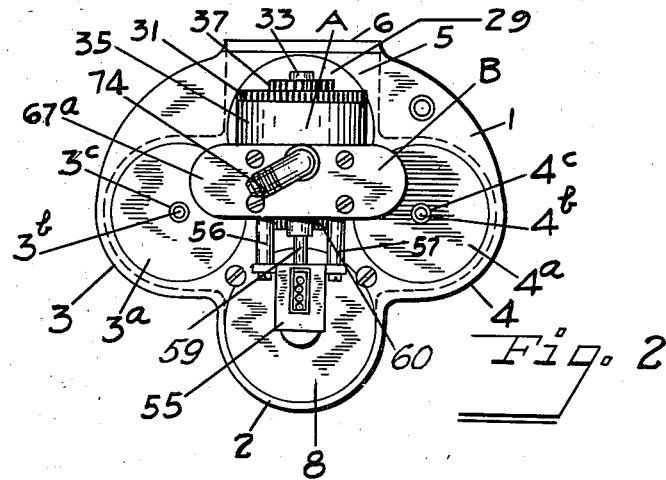

Sept. 1, 1936.     D. R. McGREGOR     2,052,577
APPARATUS FOR MEASURING LIQUIDS
Filed April 27, 1933     6 Sheets-Sheet 1

INVENTOR.
David Ross McGregor
BY
his ATTORNEYS

Sept. 1, 1936.  D. R. McGREGOR  2,052,577
APPARATUS FOR MEASURING LIQUIDS
Filed April 27, 1933  6 Sheets-Sheet 2
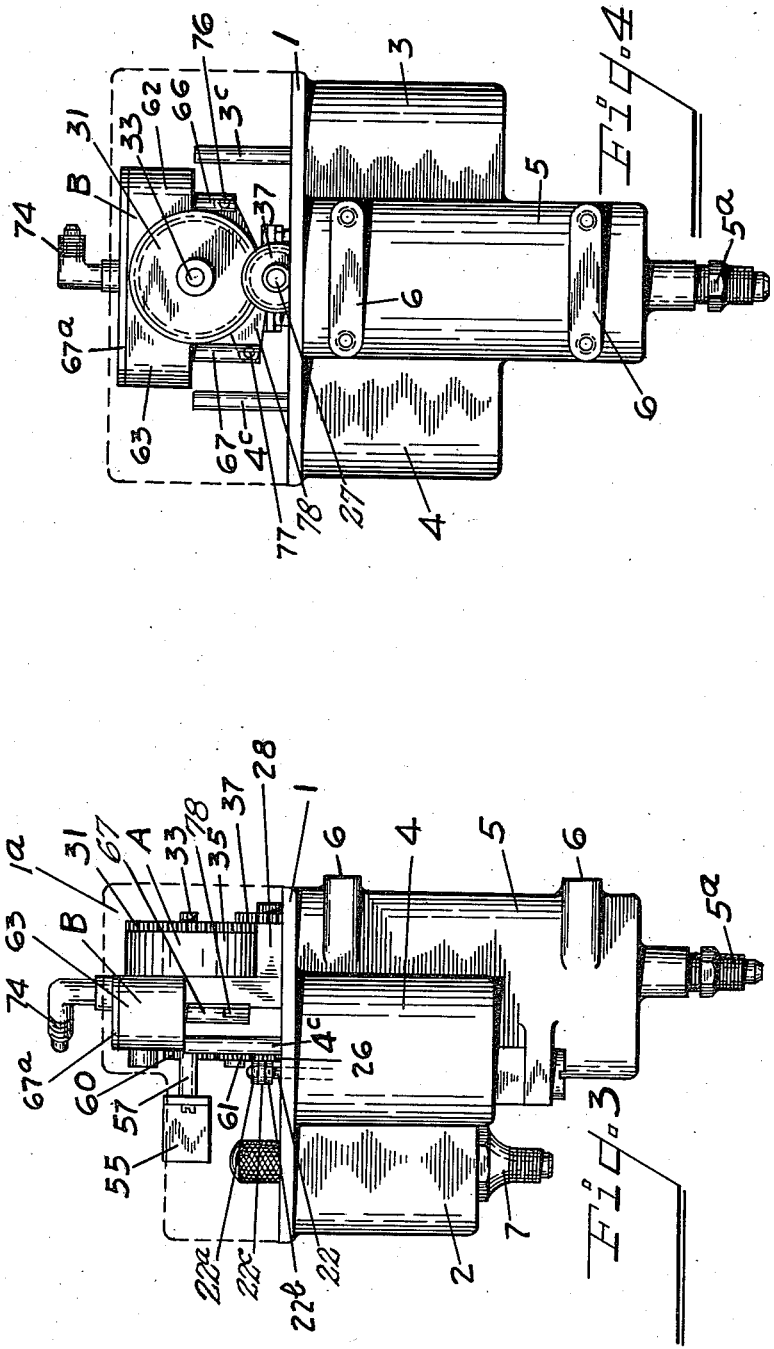
INVENTOR.
David Ross McGregor
BY
Steward & McKay
his ATTORNEYS

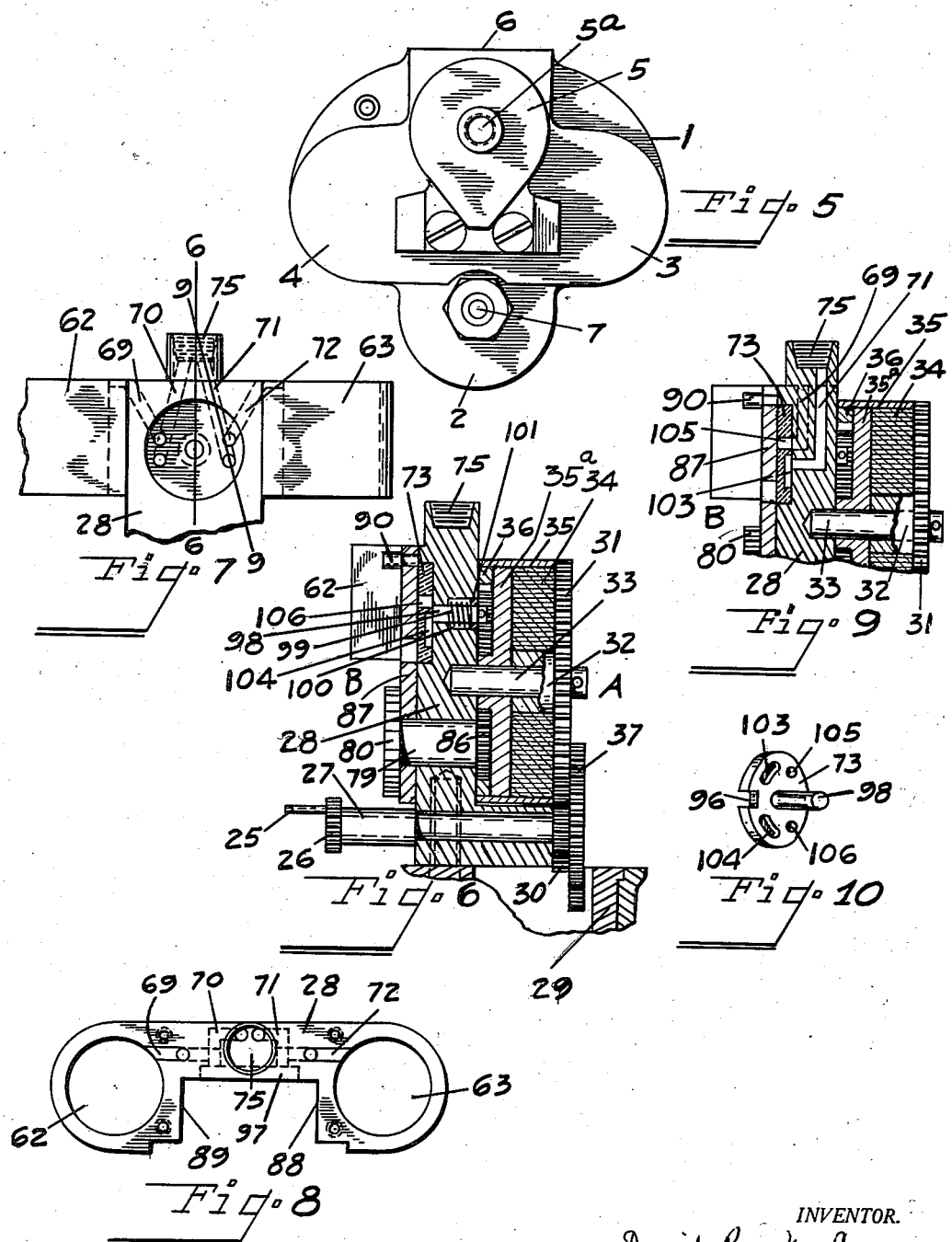

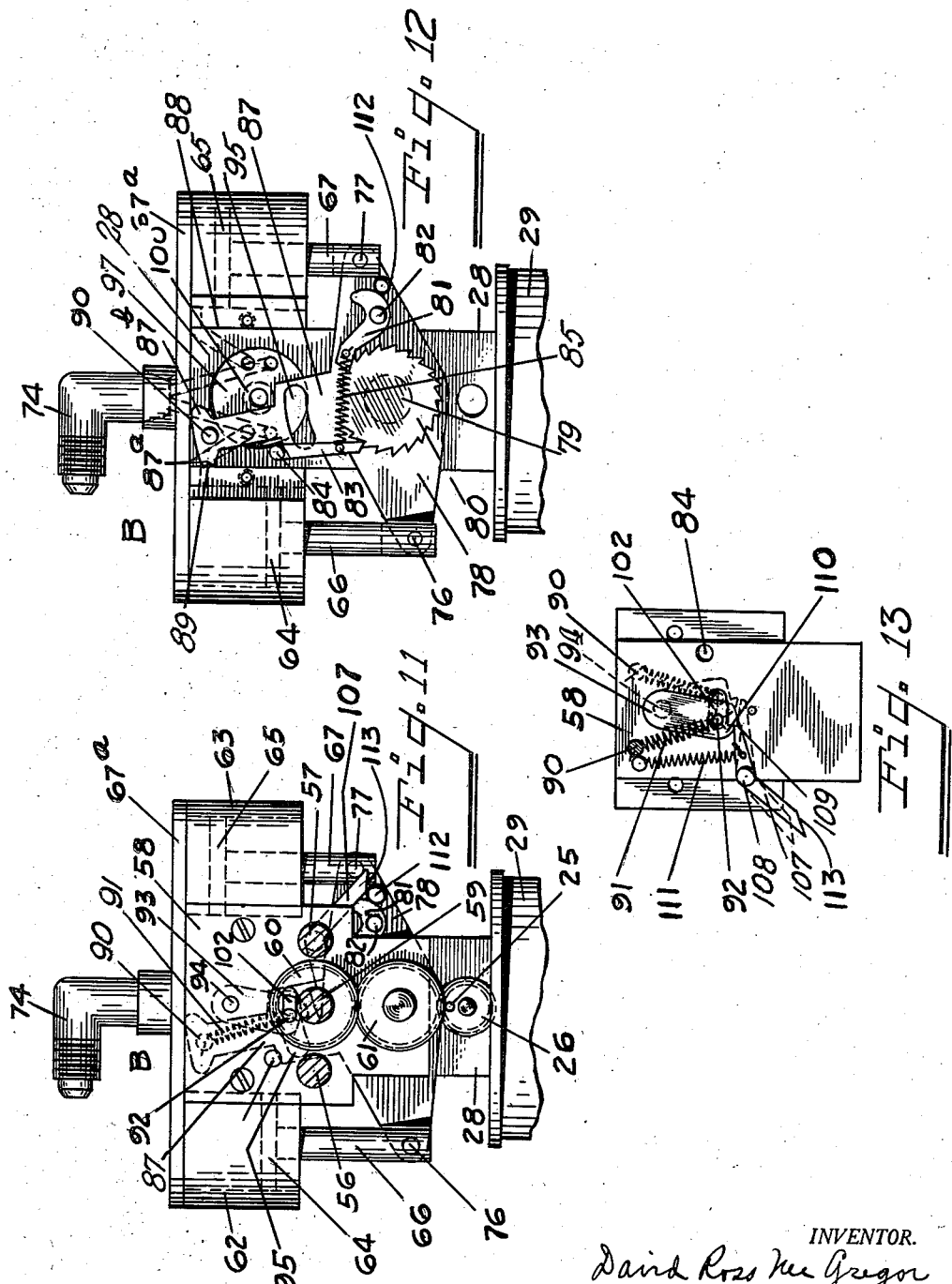

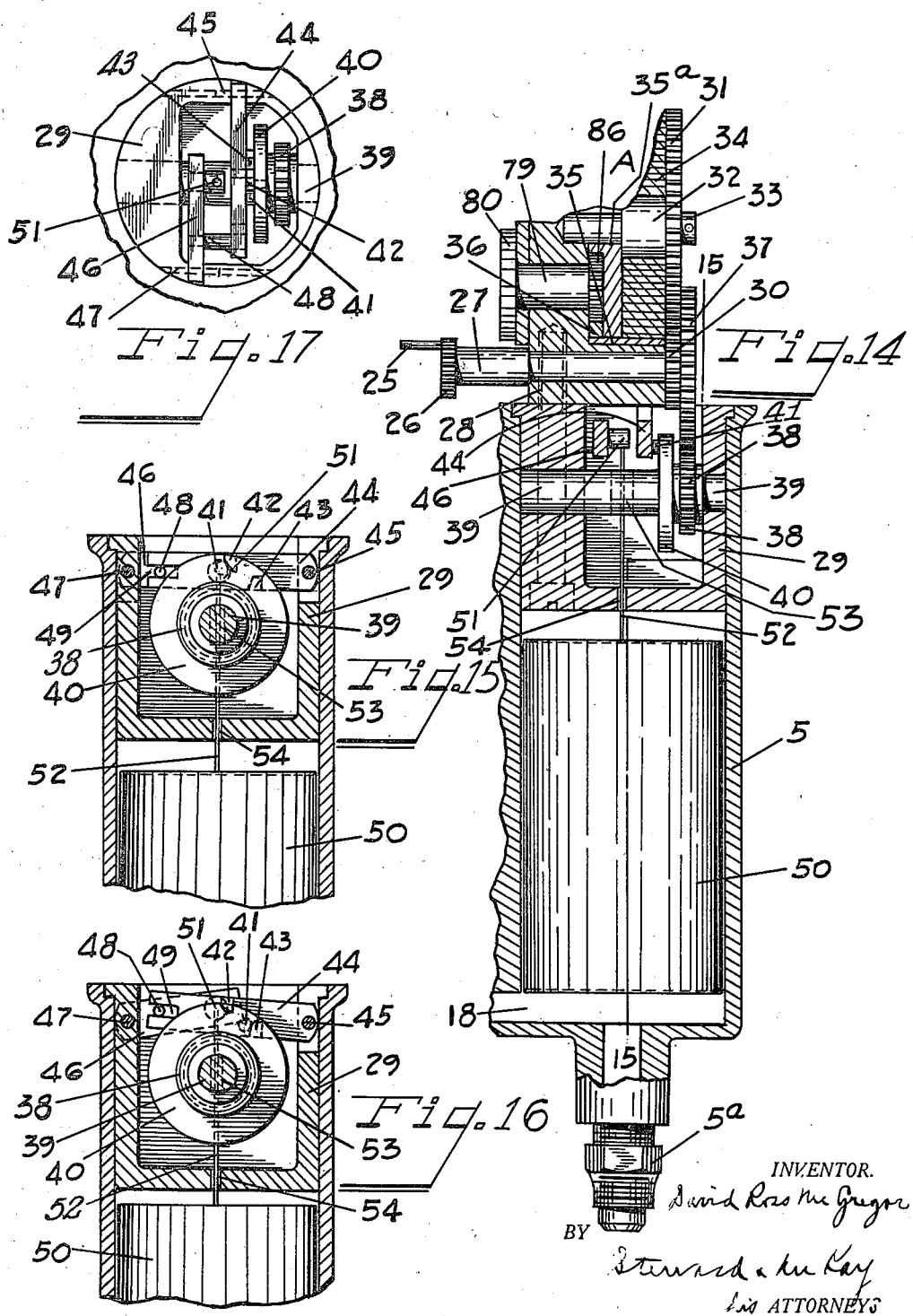

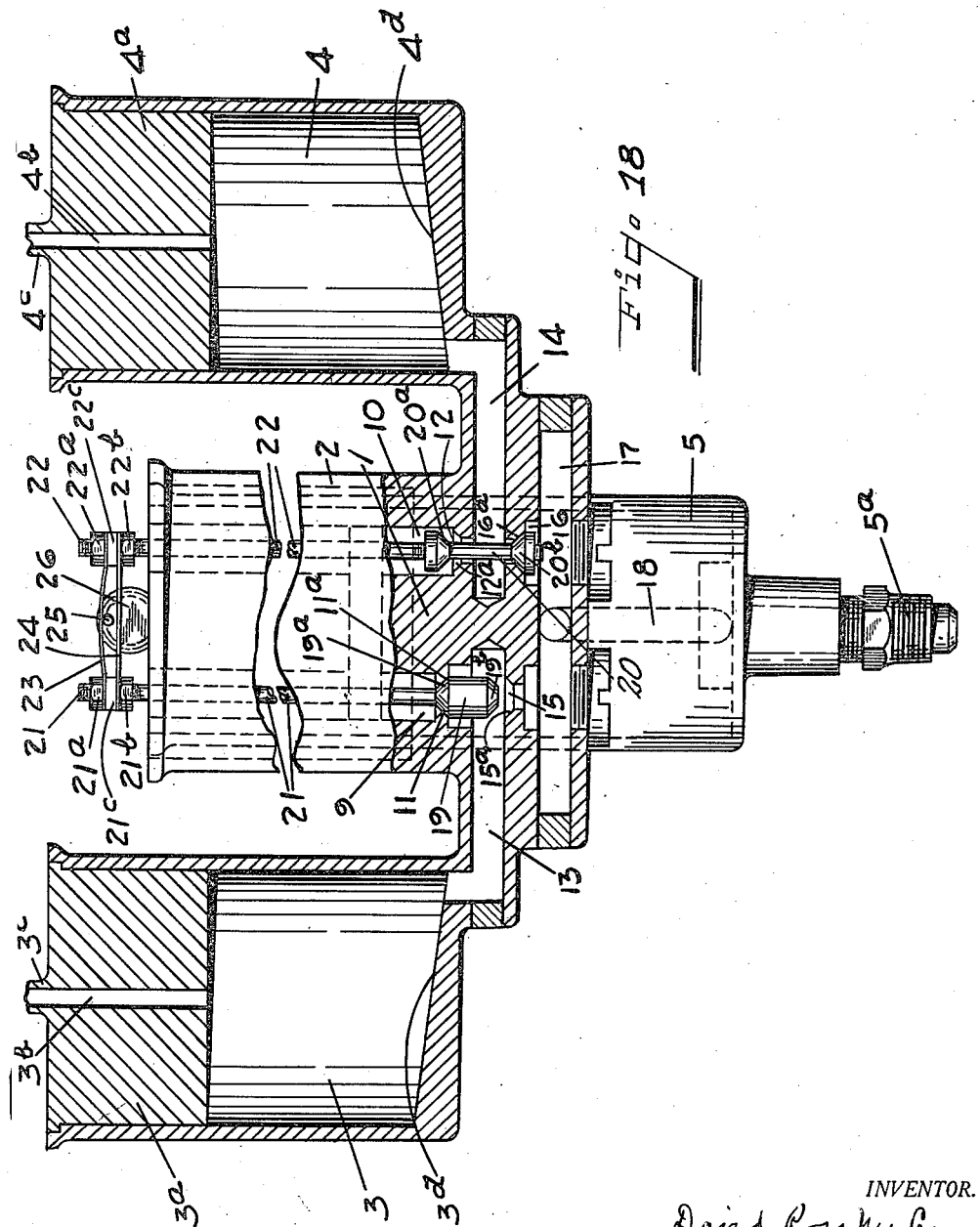

Patented Sept. 1, 1936

2,052,577

UNITED STATES PATENT OFFICE 2,052,577

APPARATUS FOR MEASURING LIQUIDS

David Ross McGregor, Springfield, Ohio

Application April 27, 1933, Serial No. 668,285

21 Claims. (Cl. 73—219)

This invention relates generally to apparatus for measuring liquids and it relates more particularly to a metering device for indicating or registering the amount of liquid passing through a conduit or the like.

This invention, although of general application, is particularly well adapted for use in indicating or registering the amount of fuel used by an internal combustion engine and therefore, in describing one practical form of apparatus embodying the invention, this use or application will be more particularly referred to. This is not to be understood, however, as limiting the scope or usefulness of the invention which, as previously pointed out, is applicable generally to the metering of liquids.

One of the principal objects of the invention is to provide liquid measuring apparatus which will register with extreme accuracy the passage of liquid, especially in comparatively small quantities, and which is automatic in operation. In connection with the automatic operation, an important feature of the invention has to do with the provision of means for utilizing the intermittent energy available from the suction or vacuum produced in the intake manifold of an internal combustion engine and for storing this intermittent energy so that it will be available instantly and continuously to operate or drive the measuring apparatus. As will be pointed out more fully hereinafter, however, this novel operating or driving means has many applications other than in connection with liquid measuring apparatus and it is to be understood that this phase of the invention is not limited to this particular application or use.

Another object of the invention is to provide liquid measuring apparatus which will operate with any type of liquid feeding means and which will deliver measured liquid continuously and uninterruptedly.

A further object of the invention is to provide liquid measuring apparatus which is positive in operation, with the mechanism compactly arranged and protected not only against damage in ordinary usage, but also against attempts to cause the apparatus to register improperly.

Another object of the invention is to provide an improved driving motor and particularly an improved type of valve operating or control mechanism for use therewith, which is of general application, and which is arranged so that the different movements of the valve will take place in regular sequence irrespective of changes in operating conditions.

Other objects and novel features and advantages of the invention will become apparent from the following description taken in conjunction with the accompanying drawings which illustrate one practical form of apparatus embodying the invention, it being understood that the description of this specific embodiment is merely illustrative and not restrictive.

Figure 1:
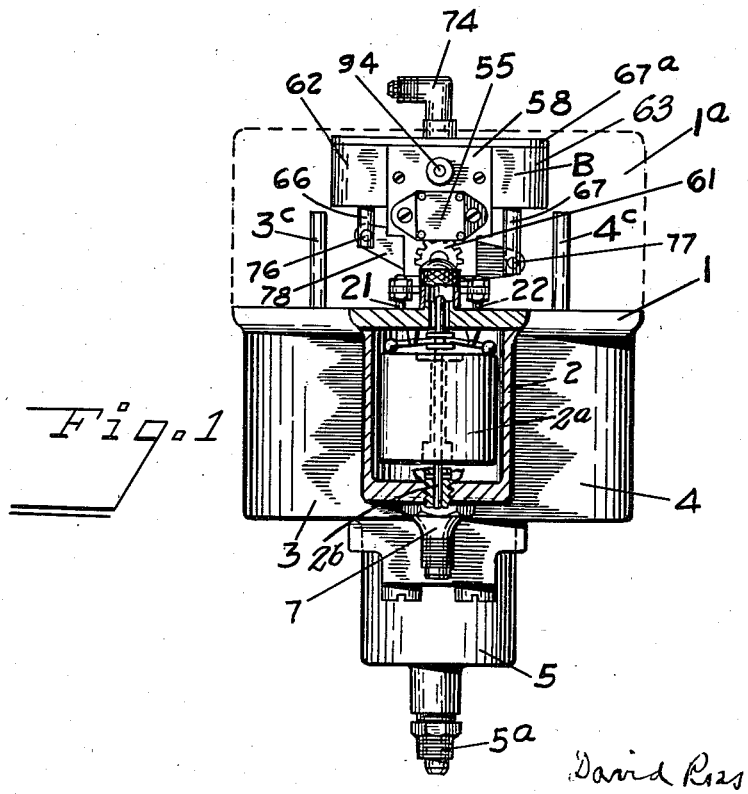

In the drawings:

Fig. 1 is a front elevation, partly in section, of liquid measuring apparatus embodying the invention, the cover, indicated in dotted outline, being left off for clarity, Fig. 2 is a top plan view, Fig. 3 is a side view, Fig. 4 is a view from the back, Fig. 5 is a view of the bottom, Fig. 6 is a fragmentary enlarged view in vertical cross-section on the line 6—6 of Fig. 7 of the vacuum motor and spring motor assembly, Fig. 7 is a fragmentary enlarged view of the front of the vacuum motor (looking from the left in Fig. 6) showing the valve recess, air ports and passages, but omitting all moving parts, Fig. 8 is a top plan view of the same, Fig. 9 is an enlarged cross sectional view of a portion of the vacuum motor with the air valve in place, somewhat similar to Fig. 6, but showing in section on the line 9—9 of Fig. 7 two of the air passages, Fig. 10 is an enlarged perspective view of the air valve of the vacuum motor, Fig. 11 is an enlarged front elevation of the vacuum motor, with the counter removed, Fig. 12 is a view similar to Fig. 11, but with the front plate and air valve removed, Fig. 13 is an enlarged view from the back of the front plate of the vacuum motor showing the toggle and locking device in their two extreme positions, Fig. 14 is an enlarged view in vertical cross section of a part of the spring motor assembly together with the escapement or stop mechanism and the float controlling it, Fig. 15 is an enlarged sectional view, on the line 15—15 of Fig. 14, of the escapement or stop mechanism with the float in lowered position, Fig. 16 is a view similar to Fig. 15 with the float in raised position, Fig. 17 is an enlarged top plan view of the escapement or stop mechanism, and Fig. 18 is an enlarged view showing the measuring chambers, liquid passages and valves in vertical section.

Referring to the drawings, 1 indicates generally a main body which, in the example illustrated, comprises an integral casting provided with four chambers or wells consisting of a supply or float chamber 2, two measuring chambers, 3, 4, and a discharge or control chamber 5. Casting 1 is provided with lugs 6 designed to receive screws or other fastening means for conveniently securing the device to any suitable support. Casting or body 1 is provided with a cover 1a, (shown in dotted outline in Figs. 1, 3 and 4) which may be locked in place, to protect the apparatus and to prevent tampering therewith.

The supply or float chamber 2 is supplied with liquid from any suitable source such as a vacuum tank, gravity tank, force feed pump, etc., through an inlet pipe connection 7 provided in the bottom thereof. Float chamber 2, which is provided with a cover 8, contains a float 2a and a float valve 2b controlled thereby, of any suitable or conventional type, for controlling the liquid supply opening or inlet 7 and for maintaining a supply of liquid at a predetermined level in said float chamber. The float controlled valve cuts off the supply when the predetermined liquid level is reached and opens to allow liquid to flow into the float chamber when the liquid level falls below the predetermined level.

As will be seen from Fig. 18, float chamber 2, measuring chambers 3, 4, and discharge chamber 5 are connected by a series of valve controlled passageways found in casting 1, the arrangement being such that the liquid to be measured is passed from the supply chamber 2 to the discharge chamber 5 through one or the other of the two measuring chambers 3, 4, which alternately fill and empty, one of the measuring chambers being filled while the other is emptying so as to provide a continuous flow of measured liquid. Referring more in detail to this construction, it will be seen that connected to the bottom of float chamber 2 are two outlet passages 9 and 10 provided in casting 1. These passages terminate in ports 11 and 12, respectively, which connect passages 9 and 10 with passages or conduits 13 and 14 opening into the bottoms of measuring chambers 3 and 4, respectively. Passages 13 and 14 are provided with discharge ports 15 and 16, respectively, opening into a passageway 17 connected by passage 18 to the bottom of the discharge chamber or sump 5. Discharge ports 15 and 16 are in alignment with inlet ports 11 and 12, respectively, these ports being formed to provide valve seats 15a, 16a, and 11a, 12a, respectively, for reciprocating valves 19 and 20 having valve faces 19a, 19b and 20a, 20b, respectively.

Valves 19 and 20 are mounted on valve stems 21 and 22, respectively, which are reciprocated or raised and lowered together by operating mechanism, which will be described hereinafter, the arrangement and operation being such that when both valves are raised (as shown in Fig. 18), inlet port 11 and outlet port 16 will be closed, and inlet port 12 and outlet port 15 will be open, so that supply chamber 2 and measuring well or chamber 4 are connected together, and measuring well or chamber 3 and discharge or sump chamber 5 are connected together. When both valves are down, these connections are reversed, inlet port 11 and outlet port 16 being open, and inlet port 12 and outlet port 15 being closed so that supply chamber 2 and measuring well or chamber 3 are connected together, and measuring well or chamber 4 and discharge chamber 5 are connected together. Thus it will be seen that the operation is one of alternately filling the measuring wells or chambers 3, 4 with liquid from supply chamber 2 and emptying them into the discharge chamber or sump 5 through the valve controlled passages connecting said chambers, one of the measuring chambers being filled while the other is emptying so as to provide a continuous and uninterrupted flow of measured liquid.

As will be seen from Fig. 18, both measuring chambers 3, 4 are identical in size and construction. They are closed at the top by displacement plugs 3a, 4a provided with restricted openings or air vents 3b, 4b in which are fitted stand pipes 3c, 4c, respectively. These plugs are so arranged that the bottoms thereof are always slightly below the level of the liquid to which the measuring chambers will be filled with liquid from the supply chamber so that when the float controlled valve in the supply chamber cuts off the supply of liquid to the measuring chamber being filled, said measuring chamber proper will be completely filled and any variance in the height of the liquid level will take place in the restricted air vent only. In other words, when a measuring chamber is filled with liquid, the liquid level is the same as that in the supply or float chamber 2, but as the bottom of each displacement plug is always slightly below this level, the height of the liquid level in the measuring chamber will vary, if at all, only in the restricted vent opening or passage. As the cross-sectional area of the vent openings or passages is very small, any variance in the height of the liquid level therein will be so small, as regards volume of liquid, as to have little or no effect on the volumetric capacity of the measuring chambers. This construction and arrangement makes it possible to measure the liquid with extreme accuracy at all times, especially as the measuring chambers are free from floats and other obstructions, and as each measuring chamber is filled and emptied through a combined filling and emptying passage connected to the bottom, this arrangement has the further advantages of compactness and simplicity. The bottoms 3d, 4d of the measuring chambers 3, 4, respectively, are preferably arranged to slope toward the filling and emptying passages so as to facilitate and ensure quick and complete drainage or emptying of the measuring chambers.

Motor means have been provided for operating the valve mechanism and the indicating or registering mechanism and, although this operating means may vary widely within the scope of the broad invention, the particular means described and illustrated herein by way of example has many important advantages which will be pointed out hereinafter.

As shown in Fig. 18, the upper ends of valve stems 21 and 22, which project through openings in the top of casting 1, are connected together by two resilient strips or plate springs 23 and 24 made of steel or other suitable material. These springs are adjustably secured to valve stems 21 and 22 by means of nuts 21a, 21b and 22a and 22b, respectively, spacing washers or disks 21c and 22c maintaining the springs in parallel spaced relation. Extending between the spaced springs 23 and 24 is a crank pin 25 eccentrically mounted on a gear wheel or disk 26, the arrangement being such that rotation of said gear wheel causes valve stems 21, 22 and valves 19, 20 carried thereby to reciprocate or move up and down. As the stroke of the valves is slightly less than the up and down movement of the crank pin 25, they are always firmly and resiliently held on their upper or lower valve seats by the upper or lower spring when the crank pin is in either of its two positions of rest. Gear wheel or eccentric 26 is rapidly rotated a half revolution at a time from the rest position shown in Fig. 18 to a rest position diametrically opposite thereto, and so on, by motor means which will be described hereinafter, each half revolution of gear or crank wheel 26 causing the valves to shift rapidly from one position to the other, this shifting taking place almost instantly so that there is practically no leakage or loss of liquid during the valve shifting operation.

As shown in Figs. 6 and 14, gear or crank wheel 26 is secured to one end of a shaft 27 which is rotatably mounted in a block or casting 28 supported by cover plate or plug 29 fitted in the top of discharge chamber or sump 5. Block or casting 28 forms a support for the means for operating gear wheel 26 and through it the valves for controlling the flow of liquid through the measuring chambers. This operating means, in the example illustrated, comprises a spring motor indicated generally by A, which is connected to and drives shaft 27 by means of a gear 30 secured to shaft 27 and a gear 31 secured to a bushing 32 rotatably mounted on a shaft 33 fixed to block or frame 28. Secured to bushing 32 is one end of a coiled spring 34, the other end of which is secured to a spring barrel 35 to which is secured an internal gear 36, spring barrel 35 being rotatably mounted on shaft 33 by means of the supporting member or disk 35a.

The operation of the spring motor is controlled by means responsive to the rise and fall of the liquid level in the discharge chamber 5, and as illustrated in Figs. 14–17, comprises broadly escapement or stop mechanism and a float for operating said stop or escapement mechanism. The escapement mechanism, which is mounted in the recessed plug or cover plate 29 fitted in the top of discharge chamber 5, is connected to spring motor A by gear 37 secured to shaft 27. Gear 37 meshes with gear 38 which is rotatably mounted on a pin or shaft 39 secured to the hollow plug 29. Gear 38 is rigidly secured to or made integral with a stop or escapement wheel 40 provided with a laterally projecting pin 41, which is adapted to cooperate with two stops or abutments 42 and 43 provided on an escapement lever 44, one end of which is pivoted at 45 to plug or casting 29. Lever 44 is adapted to be swung up and down on the pivot 45 by means of a lever 46 pivoted at 47 to plug or cover member 29, the two levers being connected together by a pin and slot connection 48, 49, the pin 48 being provided on lever 46 and the slot 49 in lever 44. As will be seen from Figs. 15 and 16, stops 42 and 43 are so positioned on lever 44 that stop 42 is in the path of pin 41 when said lever is in the lowered position and stop 43 is in the path of pin 41 when said lever is in the raised position. The arrangement and operation is such that when lever 44 is raised from the lowered position shown in Fig. 15 to the raised position shown in Fig. 16, stop 42 is moved out of the path of pin 41 and stop 43 is moved into said path, the result being that escapement wheel 40 turns clockwise about 10 degrees until pin 41 contacts with stop 43. When lever 44 is subsequently lowered to the position shown in Fig. 15, stop 43 is moved out of the path of pin 41 and stop 42 is moved into said path with the result that escapement wheel 40 turns clockwise about 350 degrees until pin 41 contacts with stop 42. The operation just described may be said to be one of setting and releasing the escapement mechanism and each rotation of the escapement wheel 40 through about 350 degrees causes crank gear 26 to rotate about 175 degrees, the gearing between the two being two to one, and this causes a reversal of valves 19 and 20 whereupon the filled measuring chamber is dumped or discharged into the sump or discharge chamber 5 and the empty or previously discharged measuring chamber begins to fill from float chamber 2. The bottom of discharge chamber or sump 5 is provided with a discharge pipe or outlet 5a for the discharge of measured liquid from the apparatus.

As previously pointed out, the stop or escapement mechanism is operated or controlled by a float 50 which operates in sump or discharge chamber 5 and which is pivotally connected at 51 to lever 46 by means of the connecting rod or link 52, said link passing through openings 53 and 54 provided in pin 39 and the bottom of plug 29, respectively. As will be seen from Fig. 14, float 50 practically fills discharge chamber 5, merely enough space being left to provide lateral clearance and to permit limited up and down movement of the float so that said float is very sensitive and is responsive to even very small variations in the level of the liquid in discharge chamber or sump 5. As this liquid level rises and falls, float 50 moves up and down to operate, or set and release, the stop or escapement mechanism. In other words, when the filled measuring chamber is dumped or discharged through passage 18 into the discharge chamber or sump, the liquid levels in the sump and the measuring well connected thereto, equalize, the liquid level in the discharge chamber rising to push up float 50 from the position shown in Figs. 14 and 15 to the position shown in Fig. 16. This "sets" the stop or escapement mechanism, as previously explained, the mechanism remaining in this position until after the level of the liquid in the discharge chamber and the measuring chamber connected thereto, has fallen to the point where said measuring chamber is completely drained or emptied, when the float 50 drops to the position shown in Figs. 14 and 15. This operates or releases the escapement mechanism, permitting the escapement wheel to complete its cycle of rotation and this in turn allows the spring motor to reverse the valves. In order to assist the float in its action, the contacting faces of stops 42 and 43 have been beveled or cut at opposing angles of about 7 degrees each as shown in Figs. 15 and 16. With this arrangement, when the float is falling under its own weight, it is also being pushed down by pressure of pin 41 on stop 43 and when rising it is being pulled up by the same pressure against an oppositely inclined surface or face on stop 42.

In order to indicate or register the operation of the valves and the consequent filling and emptying of the measuring chambers, suitable indicating or registering mechanism is provided, which, in the example illustrated, comprises a revolution counter 55 (see Figs. 1–3) supported on pins 56 and 57 carried by a front plate 58 secured to framework or block 28. Shaft 59 of the counter carries a gear 60 which is connected by idler gear 61, rotatably mounted on plate 58, to crank gear 26, the gear ratio in the example illustrated being two to one, or two revolutions of crank gear 26 registering one tenth of a gallon on the counter and twenty complete revolutions of crank gear 26 registering one gallon, each measuring well having a capacity of one fortieth of a gallon with this arrangement of the counter gearing.

As previously pointed out, one of the important features of the invention resides in the provision of means for utilizing the intermittent energy available from the suction or vacuum produced in the intake manifold of an internal combustion engine and for storing this intermittent energy so that it will be available instantly and continuously to operate or drive the measuring apparatus. The spring motor mechanism A, which comprises the means for storing the energy intermittently imparted to it, has already been described. The means for driving the spring motor A and indicated generally by B, will now be described. Referring to Figs. 1–13, driving means B comprises a vacuum or fluid pressure motor which has, in common with spring motor A, a supporting framework or casting 28 supported on plug or cover member 29. Secured to or formed integral with block or casting 28 are two cylinders 62, 63 fitted with pistons 64, 65 provided with piston rods 66, 67, respectively. The lower ends of cylinders 62, 63 are open while the upper ends are covered by a plate 67ª secured to block or casting 28. Passages 69, 70, 71 and 72 formed in block or casting 28 and controlled by a valve 73 connect cylinders 62 and 63 to any suitable source of vacuum or fluid pressure, as, for example, the intake manifold of an internal combustion engine. For convenience in attaching the vacuum pipe or connection, a pipe fitting 74 is provided which fits in a socket or recess 75 formed in block or casting 28, the upper ends of passages 70 and 71 being connected to said recess. Piston rods 66, 67 are pivotally connected at 76, 77, respectively, to a rocker arm or walking beam 78 rotatably or pivotally mounted on a shaft 79 rotatably supported by block or casting 28. When the vacuum motor just described is operated, the reciprocating motion of rocker arm 78 rotates ratchet wheel 80, secured to one end of shaft 79, by means of pawl 81 pivotally mounted at 82 on said rocker arm, in a counterclockwise direction. Clockwise rotation of ratchet wheel 80 is prevented by a pawl 83 pivoted at 84 to plate 58, pawls 81 and 83 being urged into contact with ratchet wheel 80 by a spring 85 connected to said pawls. Secured to the opposite end of shaft 79 is a small gear wheel or pinion 86 which meshes with the internal gear 36 which is a part of the spring barrel 35 so that rotation of the ratchet wheel 80 and ratchet shaft 79 therefore winds the spring 34. Whenever the back pressure of this spring exceeds the strength of the vacuum, however, the vacuum motor ceases to operate and thus overwinding of the spring is prevented.

Valve 73, which controls the operation of the vacuum motor, is operated by an integral extension or projecting arm 87 provided on rocker arm 78. As shown in Fig. 12, the projecting end of extension 87 swings between walls or abutments 88 and 89 provided on block or casting 28, stop portions 87ª and 87ᵇ of extension 87 contacting with said walls or abutments to limit the throw or movement of extension 87, rocker arm 78 and the pistons connected thereto. As shown in Figs. 11–13, the projecting end of extension 87 is provided with a laterally projecting pin 90 which is connected by a spring 91 to one end of a pin 92 secured to one end of a lever or plate 93, the other end of which is connected by pivot 94 to plate 58, spring 91 and lever 93 comprising a toggle joint or connection. Pin 92 on lever 93 extends through the arcuate slot 95 provided in extension 87 and into a slot 96 provided in the periphery of valve 73 (see Fig. 10). Valve 73 is rotatably mounted in valve recess 97 provided in block or casting 28 by means of pin 98 also rotatably mounted in block 28, the valve being held in place by means of a spring 99 embracing the valve pin or shaft 98, one end of the spring engaging the bottom of recess 100 provided in block 28 and the other end engaging a washer and pin 101 carried by the projecting end of said valve shaft. It will be seen that when rocker arm 78 and its extension 87 are swung back and forth, spring 91 will cause valve lever 93 to swing back and forth and pin 92 carried by said lever and operating in slot 96 in valve 73 will cause this valve to oscillate. By reason of the toggle connection including spring 91, the valve will be moved almost instantly from one extreme position to another and it will be resiliently held in either of these two positions. Furthermore, valve 73 will not be operated until after the toggle connection has passed dead center position. In order to define or limit the movement of valve 73, a slot 102 is provided in plate 58; pin 92, which engages and operates valve 73, projecting through and moving in said slot.

As shown in Fig. 10, one face of valve 73 is provided with two arcuate grooves or recesses 103, 104, and two holes or openings 105, 106. The grooves do not extend all the way through the valve, but the holes do. These grooves and holes, which constitute passages for the flow of fluid, cooperate with passages 69, 70, 71 and 72 in such a way that in one position of the valve, passages 69 and 70 (Fig. 7) are connected by groove or passage 104 to thereby connect cylinder 62 to vacuum. At the same time passage 72 is connected to the hole or passage 105 to thereby connect cylinder 63 to atmosphere, passage 71 leading to the source of vacuum being cut off. In the other position of the valve these connections are reversed so that cylinder 63 is connected to vacuum and cylinder 62 is connected to atmosphere.

In order to ensure operation of valve 73 in regular sequence, irrespective of changes in operating conditions, means have been provided to lock the valve against operation until the proper operating conditions have been provided. As shown in Figs. 11 and 13, a lever 107 is pivoted at 108 to plate 58. One end of lever 107 is provided with a hooked end 109 which is resiliently held in the path of movement of a projection 110 on valve operating lever 93 by a spring 111 so that when the valve lever 93 is moved as far as it will go, to the right in Fig. 11 and to the left in Fig. 13, valve lever 93 and the valve 73 will be locked against movement, (to the left in Fig. 11 and to the right in Fig. 13), until locking lever 107 is moved to release the connection of hooked end 109 with projection 110. Lever 107 is so pivoted on plate 58 that toward the end of the upward stroke of piston 65 (see Fig. 11) a pin 112 carried by rocker arm 78 engages the end 113 of locking lever 107 to swing said lever against the tension of spring 111 and cause hooked end 109 to release projection 110 on valve lever 93 to permit spring 91, which by that time has passed dead center position, to rapidly pull lever 93 and valve 73 to the position shown in Fig. 11 at the end of the upward stroke of piston 65. The connections are then reversed and piston 64 commences its upward movement under the influence of the vacuum in cylinder 62. The locking arrangement just described prevents the toggle connection and the valve being held in dead center position, as for instance when the spring is wound so tight that the vacuum is not sufficient to overcome it, in which case there would be a tendency for the rocker arm 78 and extension 87 to be held midway in its stroke, whereupon the toggle connection would be on dead center and vibration might throw the valve into dead center. As the up stroke of piston 65 is the winding stroke of the motor and the upward stroke of piston 64 is merely to reverse or return the parts to their original position, there is no need for a locking device on the upward stroke of piston 64, since there is nothing to hinder it from completing its stroke once it starts to operate.

The vacuum motor, with its valve controlling or locking means, and the spring motor, especially in combination, are especially well adapted for use in operating the measuring apparatus disclosed herein, and this combination has many advantages as will be obvious from the foregoing description. On the other hand, and as has been previously pointed out, it is obvious that this broad idea of driving or operating means for utilizing the intermittent energy available from the suction produced in the intake manifold of an internal combustion engine, in combination with a spring or spring motor for storing this intermittent energy so that it will be available instantly and continuously to drive or operate a piece of apparatus has many possible uses or applications other than the specific use referred to herein by way of example in explaining the principles of the broad invention. For example, this novel driving or operating means may be used in driving fuel supply pumps for internal combustion engines, and, in general, any apparatus requiring, or capable of using, a similar source of power.

The specific apparatus herein disclosed by way of example in explaining the principles of the broad invention was especially designed for use in indicating or registering the amount of fuel used by an internal combustion engine and therefore, in further describing the operation of the apparatus, this particular use will be referred to. When combined with an internal combustion engine (not shown) inlet 7 is connected to the fuel source, such as a vacuum tank, gravity tank, force feed pump, etc., outlet 5ᵃ is connected to the carburetor, and vacuum connection 74 is connected to the intake manifold of said engine. In operation, gasoline enters float or supply chamber 2 at pipe connection 7, filling the float chamber and measuring well or chamber 4 (Fig. 18) to a level slightly above the bottom of plug 4ᵃ, the gasoline rising slightly in vent pipe or opening 4ᵇ. When fuel is drawn from discharge chamber or sump 5 through pipe connection 5ᵃ, the liquid level falls in both the measuring well 3 with which it is connected and the sump itself. After measuring well 3 is completely drained, the liquid level continues to fall rapidly in the sump as it is almost completely filled with the float 50 (see Fig. 14). The float, which in the example illustrated, has a travel of about one quarter inch, falls with the last fall in liquid level in the sump, and pulls down lever 46 and escapement cam lever 44 connected thereto. This moves stop 43 out of the path of movement of pin 41 on escapement wheel 40 (see Figs. 15 and 16) thereby releasing said escapement wheel which rotates clockwise about 350 degrees, being driven by spring motor A. This rotates crank gear 25 about 175 degrees and instantly reverses the position of valves 19 and 20, whereupon the filled measuring chamber 4 is dumped into the sump 5 and the empty one 3 begins to fill from supply or float chamber 2. The liquid levels in the sump 5 and measuring well 4, which is now connected to sump 5, equalize, pushing up float 50, which raises lever 46 and escapement cam lever 44 connected thereto from the position shown in Fig. 15 to that shown in Fig. 16. This permits escapement wheel 40 to rotate clockwise about 10 degrees to complete its cycle of rotation. In the example illustrated, each measuring well has a capacity of one fortieth of a gallon and the filling and emptying of these measuring chambers is registered or indicated by means of the registering mechanism 55 which is driven by crank gear 26. It will be seen that the valve operating mechanism and the registering mechanism are driven by the spring motor A, the operation of the spring motor being controlled by the escapement mechanism, the escapement mechanism being controlled or operated by float 50 responsive to changes in the liquid level in discharge chamber 5. If at the time of operation of the spring motor there is sufficient vacuum, the spring motor is immediately and automatically rewound by the vacuum motor. If there is not sufficient vacuum, the spring is rewound at some future time when the vacuum is strong enough. The reserve energy contained in the spring is sufficient, in the example illustrated, to operate the mechanism through about 80 cycles, which represents the measuring and delivering of about two gallons of gasoline when each measuring well has a capacity of one fortieth of a gallon.

From the foregoing description of the construction and operation of the apparatus it will be obvious that I have provided measuring appaartus which is not only compact but positive and automatic in operation and yet which will measure liquid with extreme accuracy. This extreme accuracy is due, in part, to the fact that the volumetric capacity of the measuring wells is fixed and they are filled each time with a fixed amount of liquid, there being no floats or other mechanism to affect in any way the amount of liquid received in said measuring wells. Furthermore, the valves are instantly and positively operated by motor mechanism which is operated by power from an outside source instead of by the liquid being measured, the flow of the liquid being measured controlling the operation of the motor mechanism.

It is to be understood that the invention is not limited to the exact arrangement shown and described and that various modifications can be made without departing from the spirit and scope of the invention as defined in the claims.

What is claimed is:

1. The combination, with a source of suction produced by an internal combustion engine, of means for metering the fuel delivered to said engine, said metering means including a measuring chamber, means for successively filling said chamber with fuel and then discharging said fuel from said chamber before refilling, an indicator, a spring motor for operating such filling and discharging means and said indicator, and a vacuum motor operated by the vacuum from said source for energizing said spring motor.

2. A liquid meter comprising a supply chamber, two measuring chambers, a discharge chamber, said supply chamber being provided with means for supplying liquid to said measuring chambers and for cutting off the supply when the liquid in the measuring chambers reaches a predetermined level, valve mechanism controlling the admission of liquid to said measuring chambers from said supply chamber and the discharge of liquid from said measuring chambers to said discharge chamber, said valve mechanism being operable to first permit one measuring chamber to fill while the other measuring chamber empties and then to permit the one measuring chamber to empty while the other measuring chamber fills, indicating means, a spring motor for operating said valve mechanism and said indicating means, stop mechanism for controlling the operation of said spring motor, and float mechanism responsive to the rise and fall of the liquid level in said discharge chamber for operating said stop mechanism.

3. A liquid meter comprising two measuring chambers, means for supplying liquid by gravity to said measuring chambers, means exterior of said measuring chambers for cutting off the supply when the liquid level in the measuring chamber being supplied reaches a predetermined height, valve mechanism controlling the admission to and discharge from said measuring chambers of liquid, said valve mechanism being operable to first permit one measuring chamber to fill while the other measuring chamber empties and then to permit the one measuring chamber to empty while the other measuring chamber fills, indicating means, and motor means controlled by the flow of liquid from said measuring chambers for operating said valve mechanism and said indicating means.

4. In a liquid meter, a measuring chamber, means exterior of said chamber for supplying liquid by gravity to said chamber and for cutting off the supply when the liquid in the measuring chamber reaches a predetermined level, valve mechanism controlling the admission to and discharge from said chamber of liquid and operable to successively completely fill said chamber with liquid and then completely discharge said liquid before refilling, spring motor means for operating said valve mechanism, and intermittently operated means for energizing said spring motor means.

5. In a liquid meter, a measuring chamber, means exterior of said chamber for supplying liquid by gravity to said chamber and for cutting off the supply when the liquid in the measuring chamber reaches a predetermined level, valve mechanism controlling the admission to and discharge from said chamber of liquid and operable to successively completely fill said chamber with liquid and then completely discharge said liquid before refilling, spring motor means for operating said valve mechanism, means controlled by the flow of liquid from said measuring chamber for controlling the operation of said spring motor means, and motor means for energizing said spring motor means.

6. In a liquid meter, a measuring chamber, means exterior of said chamber for supplying liquid by gravity to said chamber and for cutting off the supply when the liquid in the measuring chamber reaches a predetermined level, valve mechanism controlling the admission to and discharge from said chamber of liquid and operable to successively completely fill said chamber with liquid and then completely discharge said liquid before refilling, motor means for operating said valve mechanism, and stop mechanism controlled by the flow of liquid from said measuring chamber for controlling the operation of said motor means.

7. In a liquid meter, a measuring chamber, means exterior of said chamber for supplying liquid by gravity to said chamber and for cutting off the supply when the liquid in the measuring chamber reaches a predetermined level, valve mechanism controlling the admission to and discharge from said chamber of liquid and operable to successively completely fill said chamber with liquid and then completely discharge said liquid before refilling, indicating means, motor means for operating said valve mechanism and said indicating means, stop mechanism for controlling the operation of said motor means, and means controlled by the flow of liquid from said measuring chamber for operating said stop mechanism.

8. In a liquid meter, a measuring chamber, means exterior of said chamber for supplying liquid by gravity to said chamber and for cutting off the supply when the liquid in the measuring chamber reaches a predetermined level, valve mechanism controlling the admission to and discharge from said chamber of liquid and operable to successively completely fill said chamber with liquid and then completely discharge said liquid before refilling, a motor for operating said valve mechanism, and a vacuum motor for energizing said first motor.

9. In a liquid meter, a measuring chamber, means exterior of said chamber for supplying liquid by gravity to said chamber and for cutting off the supply when the liquid in the measuring chamber reaches a predetermined level, valve mechanism controlling the admission to and discharge from said chamber of liquid and operable to successively completely fill said chamber with liquid and then completely discharge said liquid before refilling, a spring motor for operating said valve mechanism, and a second motor for energizing said spring motor.

10. In a liquid meter, a measuring chamber, means exterior of said chamber for supplying liquid by gravity to said chamber and for cutting off the supply when the liquid in the measuring chamber reaches a predetermined level, said measuring chamber being provided with aligned inlet and discharge ports, a reciprocating valve cooperating with said ports to control the admission to and discharge from said chamber of liquid and operable to successively completely fill said chamber with liquid and then completely discharge said liquid before refilling, spring motor means for operating said valve mechanism, and intermittently operated means for energizing said spring motor means.

11. In a liquid meter, a plurality of measuring chambers, means exterior of said chambers for supplying liquid by gravity thereto and for cutting off the supply when the liquid in said measuring chambers reaches a predetermined level, said measuring chambers each being provided with aligned inlet and discharge ports, reciprocating valves controlling said ports, said valves being arranged and operated so that the inlet port is open and the discharge port is closed in one measuring chamber when the inlet port is closed and the discharge port is open in the other measuring chamber, means for indicating the operation of said valves, motor means for operating said valves and such indicating means, stop mechanism for controlling the operation of said motor means, and means controlled by the flow of liquid from said measuring chambers for operating said stop mechanism.

12. In a liquid meter, a measuring chamber, a float valve controlled supply chamber for supplying liquid by gravity to said measuring chamber and for cutting off the supply when the liquid in the measuring chamber reaches a predetermined level, valve mechanism controlling the admission to and discharge from said chamber of liquid and operable to successively completely fill said chamber with liquid and then completely discharge said liquid before refilling, spring motor means for operating said valve mechanism, and intermittently operated means for energizing said spring motor means.

13. In a liquid meter, an integral body member provided with a supply chamber, a plurality of measuring chambers, a discharge chamber and passageways connecting said supply and measuring chambers and said measuring chambers and said discharge chamber, said supply chamber being provided with means for supplying liquid to said measuring chambers and for cutting off the supply when the liquid in the measuring chambers reaches a predetermined level, valve mechanism controlling the admission to and discharge from said measuring chambers of liquid and operable to successively completely fill each measuring chamber with liquid and then completely discharge said liquid to said discharge chamber before refilling, one of said measuring chambers being filled while the other is being emptied, indicating means, a motor for operating said valve mechanism and said indicating means, stop mechanism for controlling the operation of said motor, and means responsive to the rise and fall of the liquid level in said discharge chamber for operating said stop mechanism.

14. In a liquid meter, a measuring chamber, means exterior of said chamber for supplying liquid by gravity to said chamber and for cutting off the supply when the liquid in the measuring chamber reaches a predetermined level, valve mechanism controlling the admission to and discharge from said chamber of liquid and operable to successively completely fill said chamber with liquid and then completely discharge said liquid before refilling, and quick-acting power operated means receiving power independently of the liquid measured for suddenly operating said valve mechanism.

15. In a liquid meter, a plurality of measuring chambers, a float valve controlled supply chamber for supplying liquid by gravity to said measuring chambers and for cutting off the supply when the liquid in the measuring chambers reaches a predetermined level, said measuring chambers each being provided with alined inlet and discharge ports, reciprocating valves controlling said ports, said valves being arranged and operated so that the inlet port is open and the discharge port is closed in one measuring chamber when the inlet port is closed and the discharge port is open in the other measuring chamber, and rotatable quick-acting mechanism for suddenly operating said valves.

16. A liquid meter comprising a measuring chamber, means exterior of said chamber for supplying liquid by gravity to said chamber and for cutting off the supply when the liquid in the measuring chamber reaches a predetermined level, valve mechanism controlling the admission to and discharge from said chamber of liquid and operable to successively completely fill said chamber with liquid and then completely discharge said liquid before refilling, indicating means controlled by said valve mechanism, a spring motor for operating said valve mechanism and said indicating means, and a vacuum motor for energizing said spring motor.

17. In a liquid meter, a plurality of measuring chambers, means exterior of said chambers for supplying liquid by gravity to said chambers and for cutting off the supply when the liquid in the measuring chambers reaches a predetermined level, valve mechanism controlling the admission to and discharge from said chambers of liquid and operable to successively completely fill each chamber with liquid and then completely discharge said liquid before refilling, one of said chambers being filled while the other is being emptied, motor means for operating said valve mechanism, means automatically operated simultaneously with the operation of said valve mechanism for indicating each operation thereof, and motor means for energizing said first-mentioned motor means.

18. A liquid meter comprising a plurality of measuring chambers, means exterior of said chambers for supplying liquid by gravity thereto and for cutting off the supply when the liquid in the measuring chambers reaches a predetermined level, valve mechanism controlling the admission to and discharge from said chambers of liquid and operable to successively completely fill each chamber with liquid and then completely discharge said liquid before refilling, one of said measuring chambers being filled while the other is discharging, means for indicating the operation of said valve mechanism, motor means for operating said valve mechanism, stop mechanism for controlling the operation of said motor means, and means controlled by the flow of liquid from said measuring chambers for operating said stop mechanism.

19. A liquid meter comprising a plurality of measuring chambers, a discharge chamber, means exterior of said measuring chambers for supplying liquid thereto by gravity and for cutting off the supply when the liquid in the measuring chambers reaches a predetermined level, valve mechanism controlling the admission to and discharge from said measuring chambers of liquid and operable to successively completely fill each measuring chamber with liquid and then completely discharge said liquid into said discharge chamber before refilling, one of said measuring chambers being filled while the other is discharging, indicating means, a motor for operating said valve mechanism and said indicating means, stop mechanism for controlling the operation of said motor, and means responsive to the rise and fall of the liquid level in said discharge chamber for operating said stop mechanism.

20. A liquid meter comprising a plurality of measuring chambers, a discharge chamber, means exterior of said measuring chambers for supplying liquid thereto by gravity and for cutting off the supply when the liquid in the measuring chambers reaches a predetermined level, valve mechanism controlling the admission to and discharge from said measuring chambers of liquid and operable to successively completely fill each measuring chamber with liquid and then completely discharge said liquid before refilling, one of said measuring chambers being filled while the other is discharging, indicating means, a spring motor for operating said valve mechanism and said indicating means, intermittently operated means for energizing said spring motor, and means responsive to the rise and fall of the liquid level in said discharge chamber for controlling the operation of said spring motor.

21. A liquid meter comprising a plurality of measuring chambers, a discharge chamber, means exterior of said measuring chambers for supplying liquid thereto by gravity and for cutting off the supply when the liquid in the measuring chambers reaches a predetermined level, valve mechanism controlling the admission to and discharge from said measuring chambers of liquid and operable to successively completely fill each measuring chamber with liquid, and then completely discharge said liquid before refilling, one of said measuring chambers being filled while the other is discharging, indicating means, a spring motor for operating said valve mechanism and said indicating means, stop mechanism for controlling the operation of said spring motor, and float mechanism responsive to the rise and fall of the liquid level in said discharge chamber for operating said stop mechanism.

DAVID ROSS McGREGOR.